United States Patent Office 2,725,628
Patented Dec. 6, 1955

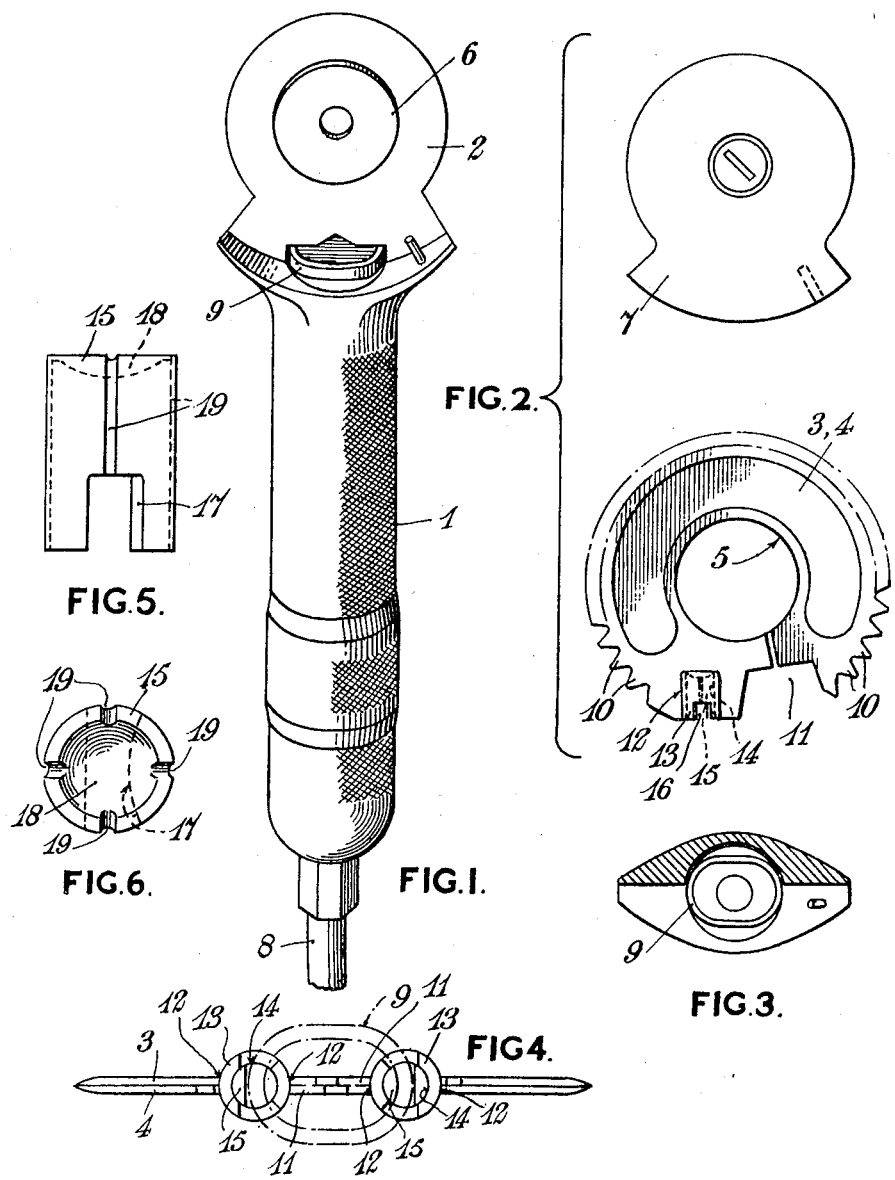

2,725,628

CUTTING, CLIPPING AND SKINNING TOOLS

William Jack O'Neilly, Wembley Park, and Alfred Champion, Boxmoor, England

Application January 10, 1952, Serial No. 265,798

1 Claim. (Cl. 30—216)

This invention is concerned with a tool suitable for use in cutting, clipping, skinning and shearing operations an object being to provide an improved tool suitable for carrying out various operations such as skinning or shearing animals, cutting linoleum, cloth and carpets and so on.

In this specification, tools according to the invention are referred to generically as cutting tools.

Various proposals have from time to time been put forward for the provision of cutting tools for skinning and shearing animals but most of them have been open to objection in practice. For example some were so designed that liquid waste produced during the skinning process found its way into the driving gear thus destroying the somewhat delicate mechanism in a comparatively short time while others made use of driving mechanism remote from the tool and connected to the tool by means of a reciprocating flexible member. This was a clumsy arrangement because the reciprocating flexible member passing through the handle of the tool caused such vibrations that the tool was most unpleasant to operate.

According to the present invention there is provided a cutting tool comprising a handle portion to be gripped by the user, a cutting head on the handle portion, a rotatable cam supported on the handle portion at the cutting head, a projecting cam wall of substantially oval outline on the cam, means for rotating the cam, the cutting head including two flat disc-shaped cutting blades arranged face to face and supported at their centres for angular movement in a plane which corresponds substantially to the plane of the axis of the cam, co-operating cutting teeth provided around corresponding portions of the periphery of said blades, each of said blades being provided with a pair of peripheral spaced slots adapted to co-operate with opposite portions of said projecting cam wall, one of the slots in each blade being longer than the other in a circumferential direction, the smaller of the two slots in each blade being formed in a strengthening piece inserted into the blade, the relative position of the two slots in the respective blades being reversed so that when the cam is rotated and the cam wall engages the shorter slot of one blade it idles in the longer slot of the other blade so that the blades will be angularly oscillated in opposite directions to effect cutting.

The cutting blades may be in the form of discs with cutting teeth around a part of the periphery.

Preferably both blades are provided with a strengthened inserted part to engage directly with the oval cam in such a manner that in operation the blades are oscillated in opposite directions.

In this specification the word "oscillate" is used to include an angular movement of a disc shaped blade or blades in which the blade or blades rotate through a few degrees one way and then a few degrees the other way relatively to a fixed central point.

Experiments have shown that the rapid oscillation of a blade is apt to lead to wear on the blade at the place where it makes contact with the cam so that after a time a blade tends to develop irregularities and may have to be replaced. It is therefore now proposed according to a feature of the invention to strengthen or to fortify that part of a blade which engages with the cam by providing an insert of hardened metal in order to minimise wear.

In one embodiment of the invention two disc shaped blades are used each provided with a cylindrical bush which is let into the edge of the blade and secured therein so that the longitudinal axis of the bush lies substantially in the plane of the blade. Within the bush is a plug of hardened metal and in the outer end of the plug is a relatively narrow slot which is engaged by the cam, the bush also being slotted to give a clearance for the cam. Spaced from the bush is a relatively long slot and when the two blades are superposed so that their axes coincide, the bush of each blade is accommodated in the long slot of the other blade, the length of these long slots being such as to permit the relative oscillatory motion of the blades. Since the cam engages the plug of hardened metal, wear is reduced to a minimum. In order to provide for the proper engagement of the cam as it moves in the slot of each plug, the latter is freely mounted in its bush so that it can take up any required position relative to the blade and according to the curvature of the blade.

In order that the invention may be clearly understood reference is now directed to the accompanying drawings in which—

Figure 1 is a side view of a part of a cutting tool according to the invention including the handle and the support on which the blades are mounted.

Figure 2 shows in side elevation one of the disc shaped blades having a strengthened inserted part and a cover plate for the blades.

Figure 3 is a sectional plan showing the oval cam.

Figure 4 is an underneath plan view with the cam shown in broken lines.

Figures 5 and 6 are detail views to an enlarged scale showing one form of plug for insertion into the bush.

Referring to the drawings 1 indicates the handle of the tool and 2 a seating or support for disc shaped blades 3 and 4. When the blades 3 and 4 are assembled on the support 2 by fitting an opening 5 in each of the blades over a boss 6 on the support a cover plate 7 is put in position and secured in any convenient manner to make the tool ready for operation.

The tool is operated by electrical means or by compressed gas or in any other convenient manner and a flexible connector 8 entering the handle 1 at the end of the tool remote from the cutting head may carry electrical conductors to couple an electric motor in the handle to a source of electrical supply or may be a conduit to carry compressed air from a source of compressed air to an air operated motor in the handle 1. Alternatively the connector 8 may carry a rotatable shaft adapted to be operated by means remote from the tool.

In operation the drive is transmitted by a driving shaft in the handle 1 to an oval cam 9 having a projecting cam wall which engages with the blades to oscillate them in opposite directions. The blades 3 and 4 are substantially circular in shape and have teeth 10 around a part of the periphery. Each blade has a long slot 11 and the blades are also cut away at 12 to provide another slot into which a bush 13 is welded. The bush 13 is bored at 14 to receive an inserted plug 15 which is adjustably mounted within the bush 13. The bush 13 is rounded or cut away at 16 to give clearance for the cam and the inner surface of the plug 15 is rounded as shown at 17 to minimise wear. It will be understood that the blades 3 and 4 are identical and when assembled face to face on the boss 6, the bush of one blade is accommodated in slot 11 of the other blade. Since one or other of the walls of the slots in each plug is in engagement with the cam wall, it will be clear that, as the cam revolves, the plugs will be moved alternately towards and away from each other and as the plugs are housed in bushes fixed to the blades a relative oscillatory motion will be imparted to the blades. It will be clear that the length of the slots 11 must be such as to permit this movement.

In operation therefore the plugs automatically undergo an angular adjustment on their longitudinal axes to take up a required position according to the profile of the cam and to further minimise wear the plugs are shaped to match the curved portion of the cam. The plugs are made of hardened metal so that wear is further reduced. The plugs are held in their respective bushes by the engagement of the plugs with the cam wall, therefore should a plug become unserviceable, it may be easily removed and replaced by merely removing the blades so that the plugs are no longer engaged by the cam.

In order to facilitate lubrication of the plugs 15 each plug may be provided with a well or reservoir 18 and with grooves 19 leading from the well or reservoir 18 to the bore in the bush into which the plugs are inserted. If desired the bushes may be made from a tubular piece of metal cut to the required length with the inner end closed by a brass or other pad or cap to retain grease in the well or reservoir 18.

What we claim is:

A cutting blade, comprising a flat disc-shaped body adapted to be supported for oscillation about its center, a plurality of cutting teeth in the periphery of said body, a pair of peripheral spaced slots in said body, one of said slots being fitted with a bush secured therein, and a hardened plug removably seated in said bush, the axes of said bush and said plug being disposed in the plane of said blade, said plug having a slot extending inwardly from the end thereof adjacent the periphery of said blade, said last slot being curved and arranged to receive the wall of a rotating cam therein, by which the blade may be oscillated, the other of said spaced slots providing for clearance of the plug of a similarly formed blade associated with the first blade when oscillation thereof is effected by a cam as previously mentioned.

References Cited in the file of this patent

UNITED STATES PATENTS

| | | |
|---|---|---|
| 1,228,838 | Schutz | June 5, 1917 |
| 1,506,719 | Thuau | Aug. 26, 1924 |
| 1,859,457 | Newhouse | May 24, 1932 |
| 1,929,040 | Schmid et al. | Oct. 3, 1933 |
| 2,565,878 | O'Neilly | Aug. 28, 1951 |

FOREIGN PATENTS

| | | |
|---|---|---|
| 66,685 | Sweden | Jan. 25, 1927 |